United States Patent Office 2,894,873
Patented July 14, 1959

2,894,873

CONTINUOUSLY TREATING SEEDS BY INTERACTION THEREUPON TO PRODUCE DESIRED WEIGHT OF SEED TREATING AGENT

Raymond P. Seven, Wheaton, Ill., assignor, by mesne assignments, to Morton Chemical Company, Chicago, Ill., a corporation of Delaware No Drawing. Application February 18, 1957
Serial No. 640,583

9 Claims. (Cl. 167—38)

This invention relates to new and improved methods for the treatment of seed. More particularly, this invention relates to new and improved methods for the treatment of seed involving application of a plurality of homogeneous liquids thereto.

As is well known, seeds are usually infected with various micro-organisms such as bacteria, fungi, yeasts and pseudo-yeasts. Many of these organisms are benign; in fact, some species of organisms are beneficial or even essential to the growth of plants resulting from the germination of certain species of seed as evidenced by the well known symbiosis of certain nitrogen fixing bacteria and leguminous plants. All too frequently however, these micro-organisms have an adverse effect on seed or on plants from the germination thereof and it is no problem to list over 200 known species of malign seed borne organisms. These malign organisms may multiply during storage of the seed and attack the seed host, resulting in seed rot or seed decay with a consequent pronounced reduction or even complete destruction of the germinating power of the seed. More frequently, the malign infecting organisms remain dormant during storage of the seed (frequently in spor form) only to multipy in the favorable environment resulting from the planting of the seed. These micro-organisms then attack and injure or destroy the seed or young plants from the germination thereof, resulting in a sparse and unthrifty stand infected with smuts, scabs, other blights, and the like, followed by a deficient crop or even a complete crop failure.

Also, even in the unlikely event that the seed are not infected with pathogenic micro-organisms, almost without exception soils are heavily infested with such organisms. On planting uninfected seed in infected soils, the malign soil borne organisms attack the seed and reduce or destroy their germinating power and/or attack young plants resulting from the germination of the seed, again giving rise to a sparse and unthrifty, diseased stand and a deficient crop or even a complete crop failure.

Losses of crops from these causes would be calamities if they were exceptional and occurred only at rare intervals. Seed borne and soil borne organisms initiate veritable epiphytotics but because these have been experienced every year they have been taken more or less as matters of course and little effort has been made in the past to overcome their effects other than to employ a rate of seeding and/or to plant a sufficient acreage to give, on the basis of past experience, the required harvest.

More recently it has been conventional to treat many species of seed, at some time prior to the planting thereof, with a treating agent to destroy any pathogenic micro-organisms that may be infecting the seed and/or to protect the seed after planting from malign soil borne organisms. The seed may be treated by some variation of the wet process or by the dry or dusting process. In the wet process, the seed are contacted with a solution or suspension of the treating agent while in the dry or dusting process the seed are contacted with a finely divided treating agent which is usually diluted with a greater or lesser quantity of a finely divided inert material.

Wet processes involving the soaking of the seed with a solution or suspension of the treating agent and the dry or dusting process for treating seed exhibit many inherent disadvantages and shortcomings. In an attempt to avoid the many disadvantages of such wet processes and the dry or dusting process for treating seed the so-called slurry process was developed for the treatment of seed. In the slurry seed treating process, a water suspension of the treating agent is maintained in a reservoir, the reservoir being provided with efficient agitation means to maintain a uniform suspension therein. An endless belt bucket elevator passes from the reservoir to the seed treating vessel proper. The belt of the elevator is provided with buckets of uniform size (conventionally, buckets with capacities of 15, 23, or 46 cc. are employed) and each time a bucket rises from the reservoir and discharges into the treating vessel proper its particular volume of treating preparation is added thereto. Seed to be treated passes continuously through a gate to the treating vessel. A seed gate is employed having an orifice of a size appropriate for use with the species of seed being treated, the volume of buckets employed and other treating conditions that obtain in the particular seed treating operation. The treating vessel proper is provided with an efficient agitator, usually consisting of rapidly revolving blades or rapidly revolving nylon brushes, which results in vigorous contacting of the seed and the treating preparation. Treated seed flows from the treating vessel through a second gate. It is obvious that the slurry process is a modification of wet treatment processes whereby correctly proportioned quantities of seed and treating agent in the form of a suspension are brought together more or less continuously. Because very little seed and treating agent are present in the treating vessel at any one time, very efficient and vigorous mixing of the two is achieved and as a result the required volume of the treating preparation per unit volume or weight of seed to give adequate coverage of all seeds is considerably less than in wet treatment processes involving seed soaking. In general, some 4.5 to 10 cc. of treating preparation are required in the slurry process per kilogram of seed (7 to 15 ounces per 100 pounds of seed), the exact amount varying with the nature of the seed and with the concentration of the treating suspension employed. Slurry treated seed are usually sufficiently dry for planting or for storage without being subjected to a separate drying process.

The slurry treating process obviates many of the difficulties inherent in wet processes involving seed soaking and the dry or dusting process of seed treatment. As mentioned, slurry treated seed is usually sufficiently dry to be stored or planted without a separate drying operation and the dust problems inherent in the mixing of seed with a dry powder are eliminated.

However, more frequently than not, conventional slurry seed treating processes exhibit characteristic inherent disadvantages that seriously circumscribe the applicability of the method and/or result in inefficient utilization of the treating agent employed.

Most effective seed treating agents exhibit low solubilities in water. Accordingly, in order to form a medium containing a sufficient concentration of treating agent to produce simultaneously a fully effective treatment and functionally dry treated seed, that is, seed that can be drilled immediately or stored without prior drying, it is usually necessary to apply the treating agent in the form of a suspension. This in turn requires that the reservoir holding the suspension of the treating agent be provided with efficient agitation means to maintain a suspension of uniform concentration therein. To facilitate the maintenance of a resonably stable suspension in the reservoir it is conventional practice to furnish the treating agent in the form of a wettable powder. Such compositions embrace the treating agent, the proper amount of a suitable wetting agent and usually a rather considerable proportion of an inert, finely divided filler. It is evident that when using such wettable powders, the solid eventually applied to the seed is not exclusively treating agent but, instead is treating agent diluted with wetting agent and, usually, more or less inert solids.

Furthermore, it is obvious that these practices that have been adopted to maintain a substantially uniform suspension in the reservoir are not fully effective with respect to the buckets. Since it is impossible to provide agitation in the buckets, solids settle with greater or lesser rapidity therein, resulting in increasingly deficient rates of application of the treating preparation of the seed and requiring more or less frequent cessation of seed treating operations to permit removal of accumulated solids from the buckets.

Finally, the application of such suspensions to seed gives rise to numerous disadvantages. The solids of such suspensions have a tendency to migrate to the points of contact of the seed and the partial or complete loss of water employed in forming the suspension, for example, by absorption into the seed coat, evaporation, et cetera, produces seed aggregates cemented together at their points of contact by the solids of the applied suspensions. Even if such cementing action does not occur, the partial or complete loss of suspending medium by mechanisms such as have been previously discussed results in the seed bearing a coating of non-adherent solid particles. A considerable portion of these solid particles is loss in subsequent handling of the seed, giving rise to a dust problem that is annoying at best and usually representing a health hazard due to the toxic nature of most seed treating agents. Also, mechanical loss of treating agent from the seed surfaces as dust reduces the effectiveness of the treatment and represents a loss of valuable treating agent.

In some instances it is possible to prepare true solutions containing a sufficient concentration of treating agent to produce simultaneously a fully effective seed treatment and functionally dry treated seed. A liquid seed treater may be employed with such treating preparations. One form of such a liquid seed treater involves movement of the treating solution to an unagitated reservoir, for example, by pumping the treating solution from the bulk supply thereof to the reservoir, the reservoir being provided with a constant level overflow whereby treating solution pumped to the reservoir in excess of actual treating requirements is returned to the bulk supply of treating solution. Seed is introduced into the treating vessel by means of a weight-tripped hopper. Two such hoppers are usually provided. One hopper fills with a predetermined weight of seed and is then tripped and its contents discharged into the treating vessel. During discharge of this first hopper, the second hopper takes on the predetermined weight of seed. The weight of seed required to trip a hopper is adjustable by means familiar to those skilled in the art relating to such devices. The discharge of each hopper load of seed of predetermined weight from the hopper to the treating vessel simultaneously and automatically activates a dipper in the reservoir containing the treating solution, whereby a predetermined volume of treating solution is also introduced into the treating vessel where it admixes with the hopper load of seed simultaneously discharged into the treating vessel. The treating vessel is in the form of a cylindrical drum mounted with the cylinder axis nearly horizontal but sloping downward slightly towards the discharge end of the drum. The drum is slowly revolved on its axis, thereby tumbling the mixture of seed and treating solution and gradually working the mixture to the discharge end of the drum where the treated seed falls into bags or other suitable containers.

It is evident that the liquid treating apparatus is very flexible. The tripping weight of the hoppers may be set at any desired value over a very considerable range and dippers of a wide range of capacities may be used in the reservoir. By varying either or both of these factors, any practical desired rate of application of treating solution to seed may be attained.

Liquid seed treaters are highly efficient. In one typical liquid seed treating operation, one drum (54 gallons) of the treating solution employed will effectively treat up to 10,000 bushels of grain, equivalent to the substantially uniform application of only 0.7 fluid ounce of the treating agent to one bushel of seed. This treatment, in addition to being fully effective results in functionally dry treated seed. However, there is a very limited number of possible liquid seed treating processes since, as set forth previously, it is usually impossible to prepare a true solution of a treating agent of sufficient concentration to result in, simultaneously, a fully effective treatment and functionally dry treated seed.

As will be obvious from the above descriptions, slurry seed treaters and liquid seed treaters are, broadly considered, mechanically similar in that each provides for the at least substantially uniform application of a set amount of seed treating agent to a predetermined quantity of seed. However, it is evident that the two types of apparatus are not completely but only unidirectionally interchangeable. While a treating formulation that is a true solution can be employed in connection with either a slurry seed treater or a liquid seed treater, a treating formulation that is a suspension cannot be used in a liquid seed treater due to lack of agitation means. Since this invention is exclusively concerned with the use of true solutions and in view of the suitability of both slurry and liquid seed treaters for application of true solutions, frequently herein the application device is referred to as a "slurry treater" as such treaters are generally more familiar to those skilled in the seed treating art than are liquid seed treaters but it is to be understood that since this invention is exclusively concerned with the application of true solutions to seed, the term "slurry treater" is used in a generic sense and embraces both slurry seed treaters and liquid seed treaters.

The comparatively limited number of suitable liquid seed treating compositions may, in effect, be very substantially increased by simultaneously modifying the previously described devices for seed treatment and modifying the technique of forming the coating of the treating agent on the seed.

In accordance with the above, the apparatus modifications involve providing the seed treater with a plurality (usually two) of reservoirs and a plurality of endless belt bucket elevators or a plurality of sets of reservoir dippers, the number of endless belt bucket elevators or sets of reservoir dippers being equal to the number of reservoirs provided. Each reservoir is provided with its own individual bucket or dipper system but all of these systems discharge into a single seed treating vessel. In this way, it is possible to introduce a plurality (usually two) of solutions, one from each of the reservoirs provided, into the treating vessel by means of the plurality of transfer systems provided. The rate of addition of each solution to the treating vessel may be individually controlled by any one of a number of known means or combinations thereof, such as by varying the capacity of the dippers or buckets, varying the spacing of the buckets on the endless belt, varying the speed of movement of the belt, and the like. In lieu of a plurality of solution transfer systems as described, a plural proportioning pump (usually a dual proportioning pump) may be used. Each individual reservoir feeds to the suction side of an individual cylinder of the plural proportioning pump but all cylinders discharge into the single seed treating vessel. As is well known, the discharge rates of the individual pump assemblies of a plural proportioning pump may be individually regulated. By substitution of a plural proportioning pump for the previously described solution transfer systems the solutions from the individual reservoirs may be introduced into the single seed treating vessel continuously or practically continuously rather than intermittently at frequent intervals.

The modifications in the technique of forming a coating of the fungicidal agent on the seed involve the use of a plurality (usually two) of solutions which, when brought together, interact to produce the desired seed treating agent. Each of the required solutions is held in one of the plurality of reservoirs provided. Each solution is moved from its individual reservoir and introduced into the single seed treating vessel by methods and means previously described and at a rate dictated by well known chemical principles. The solutions from the individual reservoirs intermix in the single seed treating vessel and in the presence of the seed being treated to form the treating agent by chemical interaction. As has been mentioned previously, vigorous and highly efficient agitation means are provided in the seed treating zone.

While in most instances this invention involves the more or less simultaneous addition of two solutions to the seed being treated, the solutions then interacting in the presence of the seed to produce the treating agent, the invention is not limited thereto. For example, one reservoir may contain a solution of a water insoluble treating agent dissolved in a suitable solvent therefor while the second reservoir contains water alone. On mixing these two liquids in the presence of the seed, much or all of the treating agent precipitates from the resulting aqueous solvent. As will be apparent from discussion to follow, in many instances application of the treating agent to seed in this manner is more efficient and more effective than the scheme involving direct application of the solution of the treating agent to the seed by means of a conventional, single reservoir, slurry or liquid seed treater.

Also, in the more usual case where at least two solutions are added to the treating vessel where they interact chemically in the presence of the seed to produce the actual treating agent, it is not invariably desirable that complete chemical reaction occur. Seed treatment has two aspects, first, destruction of pathogenic micro-organisms carried by the seeds themselves (herein termed disinfection) and, second, protection of planted seed and plants from the germination thereof from attack by malign soil borne organisms (herein termed protection). Frequently, one treating agent is best for disinfection while another is best for protection of the seed and in some instances it is possible to apply such an ideal disinfecting agent and such an ideal protecting agent simultaneously by the technique of this invention. As a specific example of this, sodium dimethyl dithiocarbamate is a highly effective seed disinfectant but is less effective as a seed protectant, while zinc dimethyl dithiocarbamate is an excellent seed protectant but is less effective as a seed disinfectant. By supplying one reservoir with an aqueous solution of sodium dimethyl dithiocarbamate and by placing an aqueous solution of a zinc salt in the other reservoir, it is obvious that by the technique of this invention it is possible to treat seed simultaneously with sodium dimethyl dithiocarbamate (for disinfection) and with zinc dimethyl dithiocarbamate (for protection) provided that the concentrations of the two solutions and the rates of addition thereof to the seed treating vessel are so adjusted that over any given period of time a stoichiometric excess of sodium dimethyl dithiocarbamate, relative to the zinc salt, is added to the treating vessel.

It will now be obvious that the described apparatus and application modifications eliminate the inherent disadvantages of the conventional slurry seed treating process. By this invention it is not necessary to provide wettable formulations of the treating agent which require the use of a wetting agent and, usually a rather considerable amount of inert diluent. The reservoirs hold true solutions and accordingly agitating means therein are not required and the buckets do not accumulate a solid deposit with resulting decrease in application rate.

Also, the employment of the apparatus and application modifications of this invention eliminates the cementing and dusting problems encountered with seed treated in conventional slurry treaters by conventional techniques. Most treating agents are produced in the form of insoluble precipitates as the result of the chemical interaction of appropriate reactants. The resulting precipitate is separated by filtration, washed and dried. The final dried filter cake contains aggregates formed through the operation of either or both of two mechanisms. Sintered aggregates are produced through the cementing by fusion welding, during the drying operation, of two or more individual particles of the agent at their points of contact. Cemented aggregates are produced through the cementing action of salts that are deposited during the drying operation at the points of contact of two or more individual particles of the agent. Since it is well known that the effectiveness of a treating agent generally increases as the particle size thereof decreases, conventionally an attempt is made to break up these aggregates prior to marketing the agent by grinding or similar operations. While such operations are more or less successful, they are never completely so and in addition give rise to another form of aggregates known as air flocculates, consisting of two to a very large number of individual crystals held together by static or van der Waals forces.

Accordingly, conventional fungicidal compositions contain a large proportion of aggregates of various types and the application of suspensions of such fungicides to seed by conventional slurry treating techniques results in treated seeds bearing large numbers of fungicide aggregates which are readily dislodged from the seed during the subsequent handling thereof, resulting in a considerable loss of treating agent and reduced effectiveness of treatment and the genesis of an annoying and usually hazardous dust problem.

By use of the modified apparatus and application techniques of this invention fungicide aggregates are not formed. The plurality of reactants interact in the presence of the seeds, which are solids having a comparatively large specific surface, to produce small, individual crystals of the fungicide on the seed surface. These individual crystals are not brought into intimate physical contact as occurs, for example, in a filtration operation, and since no drying operation is involved, sintered and cemented aggregates do not form and obviously the necessary conditions for the production of air flocculates do not exist. As a result, the seed surfaces are covered with small individual crystals of fungicide which are finely divided and firmly held to the seed surfaces by static and/or van der Waals forces. Accordingly, in the subsequent handling of the treated seed very little if any treating agent is dislodged.

Also, it is believed that the application techniques of this invention result in a considerable amount of actual physical concatenation of the seed and the fungicide. In the application of the plurality of solutions to the seed, a greater or lesser quantity of the individual solutions is absorbed by the seed coat prior to chemical interaction. An individual absorbed solution then diffuses in the seed coat until it reaches the diffusion boundary of another individual absorbed solution. Interaction occurs at the diffusion boundary with the formation of small, individual fungicide crystals that are partially or completely embedded in the seed coat.

Not only are the characteristic inherent disadvantages of conventional slurry seed treating procedures eliminated by the practice of this invention but of at least equal importance, and an entirely new and unexpected result, is the fact that the practice of this invention gives rise to more efficient seed treatments than are obtained by conventional slurry seed treating procedures. Because of this it is possible in the practice of this invention either to apply conventional dosages of fungicides to seed and attain a more effective treatment than has hitherto been possible or to apply less than the conventional amount of the fungicidal agent to seed and attain a treatment fully as effective as is obtained in prior art procedures.

Part at least of the increased fungicidal efficiency observed is believed to be due to the very small average particle size of the fungicidal agents formed by the practice of this invention. As has been discussed previously in detail, in the process of this invention the fungicidal agent is formed in the very presence of the seed undergoing treatment as minute individual crystals free from sintered aggregates, cemented aggregates and air flocculates. It is well known that the effectiveness of a fungicidal agent generally increases as the particle size thereof decreases.

One object of this invention is to provide a new and improved method for the treatment of seed.

Other objects of this invention will become apparent as the description thereof proceeds.

For the better understanding of this invention complete descriptions of specific embodiments thereof are given. It is to be understood that these embodiments are illustrative only and the spirit or scope of this invention is not to be limited to the particular specific embodiments chosen for purposes of illustration.

Example 1

In this example a slurry seed treater with dual reservoirs was employed. Each reservoir was provided with an individual endless belt bucket elevator provided with 15 cc. buckets, both elevators discharging into the single seed treating vessel. Seed gate No. 18 was used to control the flow of seed from the hopper to the seed treating vessel. A solution prepared by dissolving sodium dimethyl dithiocarbamate, containing 2.5 molecules of water of crystallization, in water at a rate of four pounds per gallon was added to one reservoir. This solution contained the equivalent of 2.74 pounds anhydrous sodium dimethyl dithiocarbamate per gallon of water. A 3.0 N solution (oxidation-reduction basis) of sodium hypochlorite was placed in the second reservoir. This solution represents a 30% stoichiometric excess over an equal volume of the sodium dimethyl dithiocarbamate solution. Preferably, a 10 to 50% stoichiometric excess, more or less, of the oxidizing agent is used.

The seed hopper was supplied with field corn seed and the slurry treater was placed in operation. The respective solutions in the two reservoirs were supplied to the single seed treating vessel at equal rates and interaction of these solutions in the presence of the seed introduced through the seed gate resulted in the production, in situ, of about 1.3 ounces thiram (tetramethyl thiuram disulfide) per 100 pounds of seed treated. A fully effective treatment was obtained with functionally dry treated seed.

Example 2

Sodium dimethyl dithiocarbamate hemipentahydrate was dissolved in water at a rate of 4.6 pounds per gallon to produce a solution containing the equivalent of 3.1 pounds anhydrous sodium dimethyl dithiocarbamate per gallon of water. This solution was placed in one reservoir of a dual seed treater, a 3.5 N solution (oxidation reduction basis) of sodium hypochlorite was placed in the other reservoir.

A No. 15 seed gate was placed in the outlet from the seed bin and 15 cc. bucket elevators were employed in each reservoir. Peas were added to the seed bin and the seed treater was placed in operation. A fully effective treatment of the seed was obtained. This operation resulted in the production of about 1.5 ounces thiram per hundred pounds of seed treated.

By substitution of lima bean seed for peas, all other conditions being as previously described, a fully effective treatment of these seeds was obtained.

On replacing the No. 15 gate with a No. 20 seed gate, a variety of seeds such as Cucumis, Cucurbita and Citrillus (muskmelon, cucumber, pumpkin, squash, watermelon, et cetera) were effectively treated, using solutions of the concentrations of this example and employing 15 cc. bucket elevators in each reservoir.

Example 3

Sodium dimethyl dithiocarbamate hemipentahydrate was dissolved in water at a rate of 3.92 pounds per gallon to give a solution containing the equivalent of 2.68 pounds of anhydrous sodium dimethyl dithiocarbamate per gallon of water. This solution was placed in one reservoir of a dual seed treater. A 2.86 N solution of sodium hypochlorite (oxidation-reduction basis) was placed in the other reservoir.

Using 23 cc. bucket elevators in each reservoir and seed gates appropriate to the particular seed species being treated, a wide variety of field and truck garden seeds were given a fully effective treatment, including sorghum (gate No. 15), tomato (gate No. 20), and various species, sub-species and varieties of the Brassica genus such as broccoli, Brussels sprouts, cabbage, cauliflower, collards, kale, kohlrabi, mustard and turnip seed were treated using seed gate No. 5. Using seed gate No. 10, a wide variety of vegetable seeds including carrot, eggplant, endive, lettuce, onion, pepper, radish and spinach seeds were effectively treated. In this example the rate of application was about two ounces thiram per 100 pounds of seed treated.

Example 4

Sodium dimethyl dithiocarbamate hemipentahydrate was dissolved in water at a rate of 2.93 pounds per gallon giving a solution equivalent to 2.05 pounds anhydrous sodium dimethyl dithiocarbamate per gallon of water. This solution was added to one of the reservoirs of a dual seed treater. A 2.25 N solution (oxidation reduction basis) of sodium hypochlorite was added to the other reservoir.

Using 15 cc. bucket elevators in each reservoir and a No. 15 seed gate, dry snap beans, soybeans and cow peas received a fully effective treatment when passed through the treater. About one ounce 100% thiram was formed in situ per 100 pounds seed treated.

The sodium hypochlorite solution of Examples 1 to 4 may be replaced by any one of a number of solution of alternate oxidizing agents, for example, by solutions of hydrogen peroxide, potassium permanganate, alkali metal persulfates, percarbonates, peracetates, and the like. When such substitutions are made the normality (oxidation-reduction basis) of the solution substituted should be approximately the same as that of the soluion replaced.

If desired, disodium ethylene bisdithiocarbamate (nabam) may replace sodium dimethyl dithiocarbamate in the above Examples 1 to 4, due consideration being given to the differences in molecular and equivalent weights of the two compounds, 264.4 pounds anhydrous sodium dimethyl dithiocarbamate being chemically equivalent to 256.2 pounds anhydrous nabam as far as the reaction here of interest is concerned. Generally, the same dosage (i.e. ounces of fungicide per 100 pounds of seed treated) of both thiram and the oxidation product of sodium ethylene bisdithiocarbamate is applied to a given seed species to obtain a fully effective treatment.

Example 5

The procedure of Example 1 was followed with the exception that the sodium hypochlorite solution was replaced by a 1.15 M zinc sulfate solution. By simultaneous application of the two solutions to field corn under the conditions set forth in Example 1 (15 cc. buckets in each reservoir, seed gate No. 18) a fully effective treatment was achieved.

Example 6

The procedure of Example 2 was followed with the exception that the sodium hypochlorite solution was replaced by a 1.3 M zinc sulfate solution. By simultaneous application of the two solutions under the conditions set forth in Example 2 (15 cc. buckets in each reservoir, seed gate No. 15 or 20 depending upon the species of seed being treated), a fully effective treatment of the seed species set forth in Example 2 was obtained.

Example 7

The procedure of Example 3 was followed with the exception that the sodium hypochlorite solution was replaced by a 1.12 M zinc sulfate solution. By simultaneous application of the two solutions to the seeds set forth in Example 3 under the operating conditions of Example 3 (23 cc. buckets in each reservoir, with a seed gate appropriate to the seed species being treated as set forth in said Example 3) a fully effective treatment of all seed species mentioned in Example 3 was achieved.

Example 8

The procedure of Example 4 was followed with the exception that the sodium hypochlorite solution was replaced by 0.86 M zinc sulfate solution. By simultaneous application of the two solutions to the seed species of Example 4 under the conditions of Example 4 (15 cc. buckets in each reservoir, seed gate No. 15) a fully effective treatment was obtained.

If desired, in Examples 5 to 8 the zinc sulfate solution may be replaced by solutions of water soluble salts of such metals as manganese, copper, cobalt, tin, or iron (ic). With all these metals except ferric iron, the molar concentration is the same as that given with respect to zinc sulfate in Examples 5 to 8. When trivalent iron is used, the molar concentration of the iron salt need only be two thirds as great as shown for zinc sulfate in Examples 5 to 8. If silver is employed, the molar concentration of the silver salt solution should be twice as great as shown for zinc sulfate in Examples 5 to 8.

If desired, nabam may be used in place of sodium dimethyl dithiocarbamate in the above Examples 5 to 8, due consideration being given to the fact that 264.4 pounds anhydrous sodium dimethyl dithiocarbamate is stoichiometrically equivalent to 256.2 pounds nabam. Nabam solutions may be reacted with zinc sulfate solutions as described in Examples 5 to 8 or with solutions of salts of other metals as described in the previous paragraph.

The formation, in the presence of seeds, of mercuric dimethyl dithiocarbamate of mercuric ethylene bisdithiocarbamate by the simultaneous application to the seeds of a solution of a mercuric salt and a solution of either sodium dimethyl dithiocarbamat or nabam results in particularly effective seed treatments. An even more powerful and effective treatment results if a solution of an organo mercury salt (or an organo mercury hydroxide) is employed in place of a solution of an inorganic mercuric salt. Example 9 sets forth a procedure for the treatment of seed using such a combination.

Example 9

The solution in one reservoir is prepared by dissolving sodium dimethyl dithiocarbamate, containing 2.5 molecules of water of crystallization, in water at a rate of only 0.118 pound per gallon. The second reservoir contains a solution prepared by dissolving methyl mercury hydroxide in water at a rate of 0.146 pound per gallon. Each reservoir is provided with individual 15 cc. bucket elevators and a No. 18 seed gate is employed. On passing field corn seed through the treater a fully effective treatment is obtained, the methyl mercury dimethyl dithiocarbamate being formed in the presence of the seed undergoing treatment at a rate of about 0.12 ounce per 100 pounds of seed treated.

If it is desired to treat sweet corn seed, the concentrations of the respective solutions in each reservoir are doubled but the elevator buckets and the seed gate remain as before. By this operation, about 0.24 ounce of treating agent is formed per 100 pounds of seed treated and in the presence of the seed being treated.

Example 9A

As has been previously set forth in some detail, if desired, sodium dimethyl dithiocarbamate and zinc dimethyl dithiocarbamate may be applied to seed simultaneously, the first agent primarily for disinfection, the second primarily for protection. This is accomplished by adding, over a given period of time, a stoichiometric excess of sodium dimethyl dithiocarbamate (with respect to a soluble zinc salt) to the treating vessel.

The solution in one reservoir was prepared by dissolving sodium dimethyl dithiocarbamate containing 2.5 molecules of water of crystallization, in water at a rate of four pounds per gallon. The second reservoir was supplied with a 0.86 M zinc sulfate solution. Each reservoir was provided with individual 15 cc. bucket elevators and a No. 18 seed gate was employed. On passing field corn seed through the treater sodium dimethyl dithiocarbamate and zinc dimethyl dithiocarbamate were applied to the seed simultaneously.

Example 10

A solution prepared by dissolving sodium chromate in water at a rate of 0.85 pound per gallon was placed in one reservoir of a dual seed treater. The second reservoir was provided with an aqueous solution of mercury and zinc salts prepared by dissolving mercuric nitrate hemihydrate and zinc nitrate hexahydrate at the rates, respectively, of 2.3 and 7.2 pounds per gallon of water. Each reservoir was provided with 23 cc. bucket elevators.

A wide variety of seed species were given a fully effective treatment by passing them through the seed treating vessel of the dual seed treating apparatus simultaneously with the addition of the two solutions thereto. Seed gate No. 5 was employed in treating Brassica seeds mentioned in Example 3, seed gate No. 10 was used when treating the vegetable seeds: carrot, eggplant, endive, lettuce, onion, pepper, radish and spinach, seed gate No. 15 with soybeans and cow peas and seed gate No. 20 with tomato seed. In all these treatments, the hydrated mercury-zinc chromate complex was formed in the seed treating vessel at a rate of about three ounces per 100 pounds of seed treated and in the presence of the seed undergoing treatment.

By replacing the mercury salt by a copper salt in the above, a hydrated copper-zinc chromate complex is formed in situ in the treating vessel of the dual seed treater and this material is also highly effective in treating seed.

Example 11

The first reservoir is provided with an aqueous solution prepared by dissolving sodium trichlorophenate in water at a rate of 1.65 pounds per gallon. An aqueous zinc chloride solution prepared by dissolving the anhydrous salt in water at a rate of 0.5 pound per gallon is added to the second reservoir. Each reservoir is provided with 15 cc. bucket elevators which discharge into the single seed treating vessel. Either machine delinted or acid delinted cotton seed is passed through the dual seed treater (see gate No. 15). A fully effective seed treatment results. Zinc trichlorophenate is produced in situ in the treating vessel at a rate of about one ounce per 100 pounds of seed treated.

When "fuzzy" cotton seed is being treated, the solution concentrations are adjusted to result in the formation of about 0.5 ounce zinc trichlorophenate per bushel of seed treated.

The above examples provide a complete understanding of the present invention and on the basis of these many other suitable combinations of reactants will readily occur to those skilled in the art to which the invention pertains. The process of this invention, for example, is well suited to the production, in the presence of seeds being treated, of insoluble organic mercury compounds having a high fungicidal effect. Thus, a solution of a methyl mercury compound, for example, methyl mercuric hydroxide, may be held in one reservoir and a solution of an alkali metal p-toluene sulfonamide may be present in the other reservoir. On mixing these two solutions in the presence of seeds undergoing treatment, the insoluble but highly fungicidal methyl mercury p-toluene sulfonamide will be formed. It is not essential that identical solvents be used in all reservoirs. Thus, one reservoir may contain an alcoholic solution of 8-hydroxyquinoline while an aqueous solution of a copper salt may be charged to the other reservoir. On mixing the two solutions the copper salt of 8-hydroxyquinoline results. Similarly, by mixing a solution of tetrahydrophthalimide in one organic solvent with a solution of perchloromethyl mercaptan in another organic solvent, preferably miscible with the first organic solvent, in the presence of seeds undergoing treatment, N-trichloromethyl mercapto tetrahydrophthalimide (captan) forms.

While in each of the foregoing examples both reservoirs are provided with bucket elevators of the same capacity, this is not necessary. If desired, individual reservoirs may be provided with buckets having a capacity different than that of the buckets in the other reservoir or reservoirs being used. At times, the use of buckets of different capacities in the several reservoirs is a convenience or even a necessity. For example, in many treating procedures, the use of a 15 cc. bucket elevator in one reservoir supplies the solution concerned to the seed treating zone at the desired rate. However, it is possible that a 15 cc. bucket elevator in the other reservoir would deliver the required amount of the second solution to the treating zone only if the solution in that reservoir was of inconveniently high concentration. In some instances even, solubility considerations may make the preparation of a second solution of adequate concentration for use with 15 cc. buckets an impossibility. In such circumstances, a 23 cc. or even a 46 cc. bucket elevator may be used in the second reservoir.

While only bucket capacities of 15, 23 and 46 cc. have been mentioned herein, bucket capacities are obviously not limited to these particular capacities. However, commercially available slurry seed treaters are provided with endless belt bucket elevators having bucket capacities of either 15, 23 or 46 cc. and it is obviously advantageous to follow established practices as much as possible.

The present examples describe dual seed treaters, that is slurry seed treaters with two reservoirs. However, any greater required number of reservoirs may be used. If desired, in Example 10, three reservoirs may be used containing, respectively, sodium chromate solution, mercuric nitrate (or copper salt) solution and zinc nitrate solution.

Be it remembered, that while this invention has been described in connection with specific details and specific embodiments thereof, these details and embodiments are illustrative only and are not to be considered limitations on the spirit or scope of said invention except in so far as these may be incorporated in the appended claims.

I claim:

1. The method of treating seeds including continuously introducing seed into a seed treating zone provided with agitating means, simultaneously but separately introducing a plurality of solutions into the seed treating zone, the rate of seed introduction into said seed treating zone, the solutes and the solute concentrations of the solutions and the rates of introduction of the solutions into said seed treating zone all being so concatenated that the solutes of said solutions interact in the presence of the seeds in the seed treating zone to produce a predetermined weight percentage, based on the seed, of a desired seed treating agent, and continuously removing treated seed from said seed treating zone at a rate essentially the same as the rate of introduction of seeds thereto.

2. The method of treating seeds including continuously introducing seed into a seed treating zone provided with agitating means, simultaneously but separately introducing a plurality of aqueous solutions into the seed treating zone, the rate of seed introduction into said seed treating zone, the solutes and solute concentrations of the aqueous solutions and the rates of introduction of the aqueous solutions into said seed treating zone all being so concatenated that the solutes of said aqueous solutions interact in the presence of the seeds in the seed treating zone to produce a predetermined weight percentage, based on the seed, of a desired seed treating agent, and continuously removing treated seed from said seed treating zone at a rate essentially the same as the rate of introduction of seed thereto.

3. The method of treating seeds including continuously introducing seed into a seed treating zone provided with agitating means, simultaneously but separately introducing two solutions into the seed treating zone, the rate of seed introduction into said seed treating zone, the solutes and solute concentrations of the two solutions and the rates of introduction of the two solutions into said seed treating zone all being so concatenated that the solutes of the two solutions interact in the presence of the seeds in the seed treating zone to produce a predetermined weight percentage, based on the seed, of a desired seed treating agent, and continuously removing treated seed from said seed treating zone at a rate essentially the same as the rate of introduction of seed thereto.

4. The method of treating seeds including continuously introducing seed into a seed treating zone provided with agitating means, simultaneously but separately introducing two aqueous solutions into the seed treating zone, the rate of seed introduction into said seed treating zone, the solutes and solute concentrations of the two aqueous solutions and the rates of introduction of the two aqueous solutions into said seed treating zone all being so concatenated that the solutes of the two aqueous solutions interact in the presence of the seeds in the seed treating zone to produce a predetermined weight percentage, based on the seed, of a desired seed treating agent, and continuously removing treated seed from said seed treating zone at a rate essentially the same as the rate of introduction of seed thereto.

5. The method of treeting seeds including continuously introducing seed into a seed treating zone provided with agitating means, simultaneously but separately introducing into the seed treating zone (a) an aqueous solution of an alkali metal salt of a compound selected from the group consisting of dialkyl dithiocarbamates and ethylene bis-dithiocarbamate and (b) an aqueous solution of an oxidizing agent, the rate of seed introduction into said seed treating zone, the solute concentrations of the two solutions and the rates of introduction of the two solutions into said seed treating zone all being so concatenated that the solutes of the two solutions interact in the presence of the seeds in the seed treating zone to produce from about one ounce to about four ounces of the oxidation product of the selected dithiocarbamate per 100 pounds of seed, and continuously removing treated seed from said seed treating zone at a rate essentially the same as the rate of introduction of seed thereto.

6. The method of treating seeds including continuously introducing seed into a seed treating zone provided with agitating means, simultaneously but separately introducing into the seed treating zone (a) an aqueous solution of an alkali metal salt of a compound selected from the group consisting of dialkyl dithiocarbamates and ethylene bis-dithiocarbamate and (b) an aqueous solution of a salt of a metal selected from the group consisting of zinc, ferric iron, manganese, cobalt, tin, copper, mercury and silver, the rate of seed introduction into said seed treating zone, the solute concentration of the two solutions and the rates of introduction of the two solutions into said seed treating zone all being so concatenated that the solutes of the two solutions interact in the presence of the seeds in the seed treating zone to produce from about one ounce to about four ounces of salt of the selected metal and of the selected dithiocarbamate per 100 pounds of seed, and continuously removing treated seed from said seed treating zone at a rate essentially the same as the rate of introduction of seed thereto.

7. The method of treating seeds including continuously introducing seed into a seed treating zone provided with agitating means, simultaneously but separately introducing into the seed treating zone (a) an aqueous solution of an alkali metal salt of a compound selected from the group consisting of dialkyl dithiocarbamates and ethylene bis-dithiocarbamates and (b) an aqueous solution of a compound selected from the group consisting of organo mercuric salts and organo mercuric hydroxides, the rate of seed introduction into said seed treating zone, the solute concentrations of the two solutions and the rates of introduction of the two solutions into said seed treating zone all being so concatenated that the solutes of the two solutions interact in the presence of the seeds in the seed treating zone to produce from about 0.01 ounce to about 0.2 ounce of an organo mercuric salt of the selected dithiocarbamate per 100 pounds of seed, and continuously removing treated seed from said seed treating zone at a rate essentially the same as the rate of introduction of seed thereto.

8. The method of treating seeds including continuously introducing seed into a seed treating zone provided with agitating means, simultaneously but separately introducing into the seed treating zone (a) an aqueous solution of an alkali metal chromate and (b) an aqueous solution of a zinc salt and at least one salt selected from the group consisting of copper salts and mercury salts, the rate of seed introduction into said seed treating zone, the solute concentrations of the two solutions and the rates of introduction of the two solutions into said seed treating zone all being so concatenated that the solutes of the two solutions interact in the presence of the seeds in the seed treating zone to produce from about one ounce to about four ounces of a hydrated mixed heavy metal chromate complex per 100 pounds of seed, and continuously removing treated seed from said seed treating zone at a rate esssentially the same as the rate of introduction of seed thereto.

9. The method of treating seeds including continuously introducing seed into a seed treating zone provided with agitating means, simultaneously but separately introducing into the seed treating zone (a) an aqueous solution of a zinc salt and (b) an aqueous solution of an alkali metal trichlorophenate, the rate of introduction of seed into said seed treating zone, the solute concentrations of the two solutions and the rates of introduction of the two solutions into said seed treating zone being so concatenated that the solutes of the two solutions interact in the presence of the seeds in the seed treating zone to produce from about one-half ounce to about two ounces zinc trichlorophenate per 100 pounds of seed, and continuously removing treated seed from said seed treating zone at a rate essentially the same as the rate of introduction of seed thereto.

References Cited in the file of this patent

UNITED STATES PATENTS

| | | |
|---|---|---|
| 1,618,371 | Engelmann | Feb. 22, 1927 |
| 1,764,888 | Raleigh | June 17, 1930 |
| 1,972,961 | Tisdale | Sept. 11, 1934 |
| 2,309,289 | Zade | Jan. 26, 1943 |
| 2,317,765 | Hester | Apr. 27, 1943 |
| 2,342,481 | Muller | Feb. 22, 1944 |
| 2,637,661 | Benignus | May 5, 1953 |
| 2,792,327 | Hunt | May 14, 1957 |

OTHER REFERENCES

Agr. Chem., 5:6, p. 59, June 1950.